United States Patent
Nakano et al.

(10) Patent No.: US 9,243,154 B2
(45) Date of Patent: Jan. 26, 2016

(54) PHOTO-CURABLE INK JET INK SET AND INK JET RECORDING METHOD USING THE SAME

(71) Applicant: Seiko Epson Corporation, Tokyo (JP)

(72) Inventors: Keitaro Nakano, Matsumoto (JP); Jun Ito, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 266 days.

(21) Appl. No.: 13/781,209

(22) Filed: Feb. 28, 2013

(65) Prior Publication Data

US 2013/0222497 A1    Aug. 29, 2013

(30) Foreign Application Priority Data

Feb. 29, 2012  (JP) ................. 2012-043261

(51) Int. Cl.
| | |
|---|---|
| *B41J 2/17* | (2006.01) |
| *C09D 11/30* | (2014.01) |
| *B41J 2/21* | (2006.01) |
| *C09D 11/101* | (2014.01) |
| *C09D 11/322* | (2014.01) |
| *C09D 11/38* | (2014.01) |
| *C09D 11/40* | (2014.01) |

(52) U.S. Cl.
CPC . *C09D 11/30* (2013.01); *B41J 2/17* (2013.01); *B41J 2/2114* (2013.01); *C09D 11/101* (2013.01); *C09D 11/322* (2013.01); *C09D 11/38* (2013.01); *C09D 11/40* (2013.01)

(58) Field of Classification Search
CPC ...... B41J 2/2107; B41J 2/2114; B41J 2/2117; B41J 11/0015; B41J 11/002; C09D 11/005; C09D 11/30; C09D 11/38; C09D 11/40; C09D 11/54; C09D 11/101
USPC .................................... 347/95–102
See application file for complete search history.

(56) References Cited

U.S. PATENT DOCUMENTS

| | | | |
|---|---|---|---|
| 5,270,378 A * | 12/1993 | Johnson et al. | 524/520 |
| 2007/0249750 A1* | 10/2007 | Oyanagi et al. | 522/84 |
| 2009/0041946 A1* | 2/2009 | Fukumoto et al. | 427/511 |
| 2009/0085996 A1* | 4/2009 | Kasai | 347/100 |
| 2009/0104414 A1* | 4/2009 | Furuta et al. | 428/195.1 |

FOREIGN PATENT DOCUMENTS

JP    2006-181801 A    7/2006

* cited by examiner

*Primary Examiner* — Matthew Luu
*Assistant Examiner* — Rut Patel
(74) *Attorney, Agent, or Firm* — Nutter McClennen & Fish LLP; John J. Penny, Jr.

(57) ABSTRACT

A photo-curable ink jet ink set includes an undercoating photo-curable ink jet ink containing a (meth)acrylic acid ester having a vinyl ether group expressed by general formula (I), and an overcoating photo-curable ink jet ink. The undercoating photo-curable ink jet ink has a higher surface tension than the overcoating photo-curable ink jet ink.

16 Claims, 1 Drawing Sheet

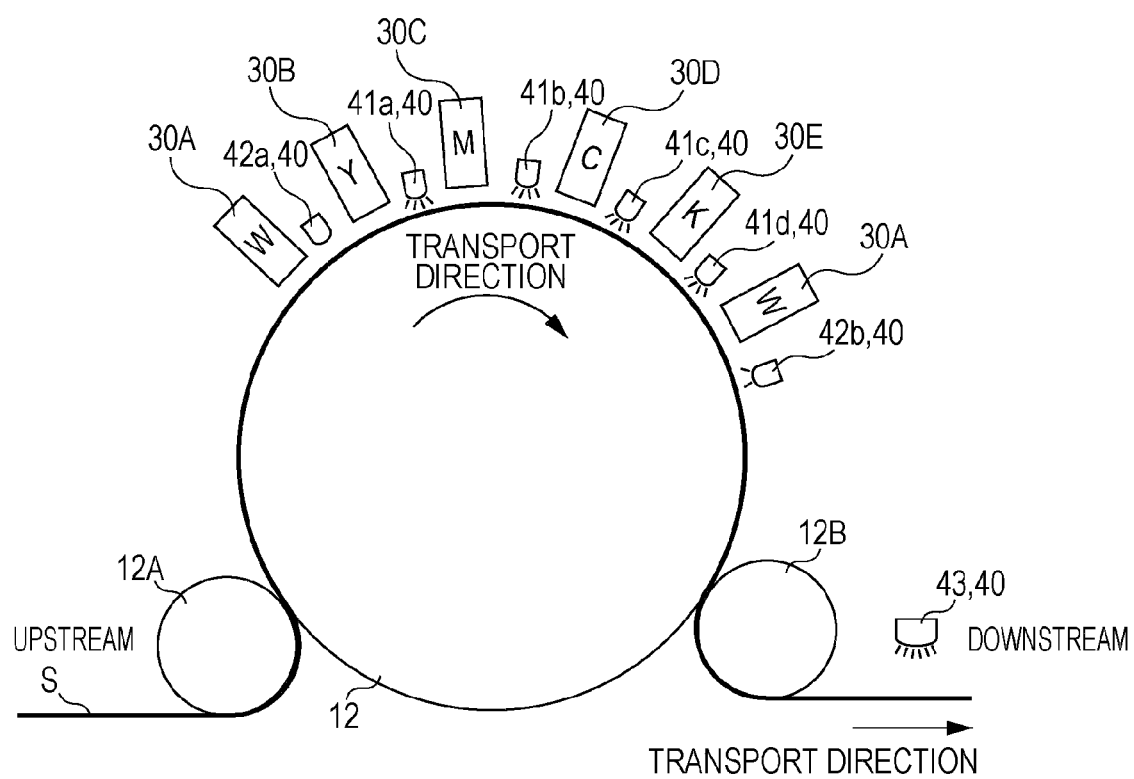

PHOTO-CURABLE INK JET INK SET AND INK JET RECORDING METHOD USING THE SAME

BACKGROUND

1. Technical Field

The present invention relates to a photo-curable ink jet ink set and an ink jet recording method using the ink set.

2. Related Art

Various techniques are applied to recording processes for forming images on a recording medium, such as paper, according to image data signals. Among such techniques is an ink jet technique in which images are formed directly on a recording medium by ejecting an ink only onto desired image portions, using an inexpensive apparatus. In the ink jet technique, inks are efficiently used, and accordingly running cost can be reduced. In addition, little noise is produced when the ink jet technique is used, and the ink jet technique is thus advantageous as a recording method.

In order to form characters and images with high fastness to water, solvents, rubbing and so forth on the surface of a recording medium, photo-curable inks that can be cured by being irradiated with light (ultraviolet light) have been used in recent years.

Also, a recording technique performed by overcoating various photo-curable inks one after another is widely used. For example, a color image may be formed by applying different color inks of cyan (C), magenta (M), yellow (Y), black (K), white (W) and other colors one on top of another, or a clear and colorless ink may be applied to the surface of a color image to protect the color image or to give gloss to the color image. For these cases, a technique for forming images having desired quality is desired.

For example, JP-A-2006-181801 discloses an overcoating method using energy ray-curable ink jet recording ink compositions. In this method, a printed coating is formed on a recording member using an energy ray-curable ink jet recording color ink composition (Ia) having a surface tension Sa (mN/m), and then the coating of the color ink is coated with a clear coating of an energy-ray curable ink jet recording clear ink composition (Ib) having a surface tension Sb (mN/m). In this instance, the surface tensions of ink composition Ia, which is applied as an undercoat, and ink composition Ib, which is applied as an overcoat, satisfy the relationships: 31.5≤Sa<35.0 or 27.0≤Sa<31.5, and Sb<Sa.

However, in the method disclosed in the above-cited patent document, when the clear ink composition is applied over the color ink coating that has been applied as an undercoat, the line width of the clear ink becomes very small. Thus, the clear ink composition cannot wet the surface or spread sufficiently.

SUMMARY

An advantage of some aspects of the invention is that it provides a photo-curable ink jet ink set including inks that exhibit a high wetting/spreading property.

The present inventors have conducted intensive research to solve the above issue, and found that the compositions of inks, particularly the composition of the undercoating photo-curable ink jet ink, has a relationship with the relationship in surface tension between the undercoating photo-curable ink jet ink and the overcoating photo-curable ink jet ink. More specifically, the inventors found that even if the surface tensions of the undercoating photo-curable ink jet ink and the overcoating photo-curable ink jet ink have the relationships disclosed in the above-cited JP-A-2006-181801, the overcoating photo-curable ink jet ink can exhibit a high wetting/spreading property in a combined use with an undercoating photo-curable ink jet ink containing a (meth)acrylic acid ester having a specific vinyl ether group.

Furthermore, the inventors found that an ink set can overcome the above issue which includes an overcoating photo-curable ink jet ink (hereinafter simply referred to as overcoating ink) and an undercoating photo-curable ink jet ink (hereinafter simply referred to as undercoating ink) containing a (meth)acrylic acid ester having a specific vinyl ether group and having a higher surface tension than the overcoating ink.

According to an aspect of the invention, a photo-curable ink jet ink set having the following features is provided.

The photo-curable ink jet ink set includes an undercoating photo-curable ink jet ink and an overcoating photo-curable ink jet ink. The undercoating photo-curable ink jet ink contains a (meth)acrylic acid ester having a vinyl ether group expressed by general formula (I): $CH_2=CR^1-COOR^2-O-CH=CH-R^3$, wherein $R^1$ represents a hydrogen atom or a methyl group, $R^2$ represents a divalent organic residue having a carbon number of 2 to 20, and $R^3$ represents a hydrogen atom or a monovalent organic residue having a carbon number of 1 to 11. The undercoating photo-curable ink jet ink has a higher surface tension than the overcoating photo-curable ink jet ink.

In the photo-curable ink jet ink set, the difference in surface tension between the undercoating photo-curable ink jet ink and the overcoating photo-curable ink jet ink may be 5 mN/m or more.

The content of the (meth)acrylic acid ester in the undercoating photo-curable ink jet ink may be 20% to 80% by mass relative to the total mass of the undercoating photo-curable ink jet ink.

The overcoating photo-curable ink jet ink may contain a (meth)acrylic acid ester having a vinyl ether group expressed by general formula (I) in a lower content than the content of the (meth)acrylic acid ester in the undercoating photo-curable ink jet ink.

The undercoating photo-curable ink jet ink may contain an acrylic surfactant.

The overcoating photo-curable ink jet ink may contain a silicone surfactant.

According to another aspect of the invention, an ink jet recording method using the above-described photo-curable ink jet ink set is provided. In the method, a coating of the undercoating photo-curable ink jet ink of the ink jet ink set is formed on a recording medium. Then, a coating of the overcoating photo-curable ink jet ink of the ink jet ink set is formed on the coating of the undercoating photo-curable ink jet ink.

BRIEF DESCRIPTION OF THE DRAWING

The invention will be described with reference to the accompanying drawing, wherein like numbers reference like elements.

The figure is a conceptual diagram of a head unit and a transport unit of a recording apparatus used in an embodiment of the invention.

DESCRIPTION OF EXEMPLARY EMBODIMENTS

Embodiments of the invention will now be described in detail. The invention is not limited to the following embodiments, and various modifications may be made within the scope and spirit of the invention.

The term "wetting/spreading property" mentioned therein is a property of an ink represented by the line width of a line of an overcoating ink formed on a coating of an undercoating ink. The term "cure or curing" mentioned herein implies that an ink is solidified by polymerizing a polymerizable compound in the ink by irradiating the ink with radiation. The term "curability" mentioned herein is a property of an ink that represents the degree in which the ink can be cured by responding to light. The term "burying property" or "filling property" is a property of an ink that represents the degree in which a cured film of an ink can cover an underlying recording medium. A high burying property implies that when a cured film (image) is formed in a recorded article, the underlying recorded medium is hidden when viewed from the image side. The term "ejection stability" is a property of an ink that represents the degree in which the ink is stably ejected in the form of droplets through nozzles without clogging the nozzles. The term "storage stability" is a property of an ink that represents the difficulty with the change in viscosity of the ink.

In the description, the words "undercoating" and "overcoating" express relative positions of coating layers of inks applied one on top of the other, and may translate into "underlying" and "overlying".

In the description, the term "(meth)acrylate" refers to at least either an acrylate or the corresponding methacrylate, and "(meth)acrylic" compound refers to at least either an acrylic compound or the corresponding methacrylic compound. "(Meth)acryloyl" refers to at least either an acryloyl or a corresponding methacryloyl.

A "recorded article" mentioned herein refers to a thing including a recording medium and a cured film formed on the recording medium by recording with an ink. Also, a cured film mentioned herein refers to a film made of a cured material, and a coating of an ink mentioned herein refers to a film formed by applying the ink and curing the applied ink, that is, a cured coating. When a coating of an overcoating photo-curable ink jet ink is formed on a coating previously formed using an undercoating photo-curable ink jet ink, whether or not the coating of the undercoating photo-curable ink jet ink is cured is determined according to the evaluation criteria of curability described later. A coating may form a solid image or a shaped image such as a picture, a character, or a pattern.

A solid image mentioned herein refers to an image defined only by pixels in which dots are formed. The pixel refers to a minimum recording unit area defining a recording resolution.

Photo-Curable Ink Jet Ink Set

The photo-curable ink jet ink set of an embodiment of the invention includes an undercoating photo-curable ink jet ink containing a (meth)acrylic acid ester having a vinyl ether group expressed by the following general formula (I), and an overcoating photo-curable ink jet ink. In addition, the undercoating ink has a higher surface tension than the overcoating ink.

The ink set may include other ink in addition to the undercoating photo-curable ink jet ink and the overcoating photo-curable ink jet ink.

First, the surface tension of the inks will be described. Preferably, the difference in surface tension between the undercoating ink and the overcoating ink ([surface tension of the undercoating ink]−[surface tension of the overcoating ink]) is 5 mN/m or more, and more preferably 10 mN/m or more. When the undercoating ink and the overcoating ink have such surface tensions, a high wetting/spreading property is exhibited.

The surface tensions of the undercoating ink and the overcoating ink are preferably in any one of the following ranges, provided that they have the relationship described above. Specifically, both the surface tensions of the overcoating ink and the undercoating ink are preferably in the range of 20 to 40 mN/m. More preferably, the surface tension of the overcoating ink is in the range of 20 to 30 mN/m, and the surface tension of the undercoating ink is in the range of 25 to 40 mN/m. An overcoating ink and an undercoating ink each having a surface tension in the above range can be stably ejected from ink jet heads.

The surface tension of an ink depends on the composition (constituents and their contents) of the ink, and mainly depends on surfactant and its content in the ink. The surfactant will be described later. The surface tension mentioned herein is a value measured by the method that will be described in Examples.

Possible constituents of the undercoating and overcoating inks will now be described. In the following description, the overcoating and undercoating inks may be collectively referred to as the ink(s).

Polymerizable Compound

The overcoating and undercoating inks contain a polymerizable compound that will be polymerized by the action of a polymerization initiator described later when irradiated with radiation, thus curing the printed ink.

1. Vinyl Ether-Containing (Meth)acrylic Acid Ester

At least the undercoating ink of the ink set contains a (meth)acrylic acid ester having a vinyl ether group expressed by general formula (I): $CH_2=CR^1-COOR^2-O-CH=CH-R^3$. In general formula (I), $R^1$ represents a hydrogen atom or a methyl group, $R^2$ represents a divalent organic group residue having a carbon number of 2 to 20, and $R^3$ represents a hydrogen atom or a monovalent organic residue having a carbon number of 1 to 11.

The (meth)acrylic acid ester having the vinyl ether group (hereinafter referred to as vinyl ether-containing (meth)acrylic acid ester) can enhance the curability of the ink and reduce the viscosity of the ink. Also, the use of the vinyl ether-containing (meth)acrylic acid ester is more advantageous in enhancing the curability of the ink than the case where a compound having the vinyl ether group and a compound having a (meth)acrylic group are each used.

In particular, when the undercoating ink contains the vinyl ether-containing (meth)acrylic acid ester, the overcoating ink can exhibit a high wetting/spreading property, and the undercoating ink exhibits high curability, and a high burying property on the recording medium.

On the other hand, the overcoating ink does not necessarily contain the vinyl ether-containing (meth)acrylic acid ester. However, it is advantageous that the overcoating ink contains the vinyl ether-containing (meth)acrylic acid ester from the viewpoint of producing the effects described later. If the overcoating ink contains the vinyl ether-containing (meth) acrylic acid ester, the vinyl ether-containing (meth)acrylic acid esters of the undercoating ink and the overcoating ink may be the same or different.

In general formula (I), the divalent organic residue represented by $R^2$, having a carbon number of 2 to 20, may be a substituted or unsubstituted linear, branched or cyclic alkylene having a carbon number of 2 to 20, a substituted or unsubstituted alkylene having an ether bond and/or an oxygen atom of an ester bond in the molecular structure and having a carbon number of 2 to 20, or a substituted or unsubstituted divalent aromatic group having a carbon number of 6 to 11. Preferred examples of these divalent organic residues include alkylene groups having a carbon number of 2 to 6, such as ethylene, n-propylene, isopropylene, and butylene; and alkylene groups having an oxygen of an ester bond in the molecular structure and having a carbon number of 2 to 9, such as oxyethylene, oxy n-propylene, oxyisopropylene, and oxybutylene.

In general formula (I), the monovalent organic residue represented by $R^3$, having a carbon number of 1 to 11 may be a substituted or unsubstituted linear, branched or cyclic alkyl group having a carbon number of 1 to 10 or a substituted or unsubstituted aromatic group having a carbon number of 6 to 11. Among these, preferred are alkyl groups having a carbon number of 1 or 2, such as methyl and ethyl, and aromatic groups having a carbon number of 6 to 8, such as phenyl and benzyl.

If any of the organic residues is substituted, the substituent may or may not contain a carbon atom. If the substituent contains a carbon atom, this carbon atom is counted in the carbon number of the organic residue. Substituents containing a carbon atom include, but are not limited to, carboxy and alkoxy. Substituents not containing a carbon atom include, but are not limited to, hydroxy and halogens.

Examples of the vinyl ether-containing (meth)acrylic acid ester include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1 vinyloxymethyl propyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

Among these, 2-(vinyloxyethoxy)ethyl (meth)acrylates, that is, 2-(vinyloxyethoxy)ethyl acrylate and 2-(vinyloxyethoxy)ethyl methacrylate, are preferred, and 2-(vinyloxyethoxy)ethyl acrylate is more preferred. These can reduce the viscosity of the ink, and also have high flash points and exhibit good curability. In particular, since 2-(vinyloxyethoxy)ethyl acrylate and 2-(vinyloxyethoxy)ethyl methacrylate have simple structures and low molecular weights, the viscosity of the ink can be reduced. Examples of the 2-(vinyloxyethoxy)ethyl (meth)acrylate include 2-(2-vinyloxyethoxy)ethyl methacrylate, 2-(1-vinyloxyethoxy)ethyl methacrylate, 2-(2-vinyloxyethoxy)ethyl acrylate, and 2-(1-vinyloxyethoxy)ethyl acrylate. In view of the curability of the ink, 2-(vinyloxyethoxy)ethyl acrylate is more suitable than 2-(vinyloxyethoxy)ethyl methacrylate.

(Meth)acrylic acid esters having the vinyl ether group may be used singly or in combination.

In the undercoating ink, the content of the vinyl ether-containing (meth)acrylic acid ester is preferably 20% to 80% by mass, more preferably 30% to 80% by mass, relative to the total mass (100%) of the undercoating ink. An undercoating ink containing 20% by mass or more of the vinyl ether-containing (meth)acrylic acid ester has a low viscosity, exhibits high curability, and allows the overcoating ink to have a higher wetting/spreading property. Also, an undercoating ink containing 80% by mass or less of the vinyl ether-containing (meth)acrylic acid ester can exhibit high storage stability.

In addition, if the overcoating ink, as well as the undercoating ink, contains the vinyl ether-containing (meth)acrylic acid ester, the content of the vinyl ether-containing (meth)acrylic acid ester in the undercoating ink is preferably higher than that in the overcoating ink, and more preferably 10% by mass or higher. Consequently, the overcoating ink can exhibit a still higher wetting/spreading property, and thus an ink set superior in various properties can be achieved.

In this instance, the vinyl ether-containing (meth)acrylic acid ester content in the overcoating ink is not particularly limited, and is preferably set in view of other properties as well as curability. The reason why the overcoating ink exhibits a high wetting/spreading property on a coating of the undercoating ink when the surface tension of the undercoating ink is higher than that of the overcoating ink while the undercoating ink contains the vinyl ether-containing (meth)acrylic acid ester may be that a coating formed from the vinyl ether group of the vinyl ether-containing (meth)acrylic acid ester affects the wetting/spreading property of the overcoating ink in some way. However, other reasons may be possible.

The vinyl ether-containing (meth)acrylic acid ester can be prepared by, but not limited to, a process (process B) of esterifying a (meth)acrylic acid and a vinyl ether having a hydroxy group, a process (process C) of esterifying a (meth)acrylic acid halide and a vinyl ether having a hydroxy group, a process (process D) of esterifying a (meth)acrylic acid anhydride and a vinyl ether having a hydroxy group, a process (process E) of esterifying a (meth)acrylic acid ester and a vinyl ether having a hydroxy group, a process (process F) of esterifying (meth)acrylic acid and a vinyl ether having a halogen, a process (process G) of esterifying an alkali (earth) metal (meth)acrylate and a vinyl ether having a halogen, a process (process H) of vinyl exchange between a (meth)acrylic acid ester having a hydroxy group and a carboxylic acid vinyl, or a process (process I) of ester-exchange between a (meth)acrylic acid ester having a hydroxy group and an alkyl vinyl ether.

Among these processes, process E is preferred from the viewpoint of achieving desired results in embodiments of the invention.

2. Other Polymerizable Compounds

The inks may further contain other polymerizable compounds such as known monofunctional, bifunctional, trifunctional and higher polyfunctional monomers and oligomers. Examples of the monomers include (meth)acrylic acid, itaconic acid, crotonic acid, isocrotonic acid, maleic acid and other unsaturated carboxylic acids, their salts and esters, urethanes, amides and their anhydrides, acrylonitrile, styrene, unsaturated polyesters, unsaturated polyethers, unsaturated polyamides, and unsaturated urethanes. Examples of the oligomers include oligomers produced from the above monomers, such as linear acrylic oligomers, epoxy (meth)acrylates, oxetane (meth)acrylates, aliphatic urethane (meth)acrylates, aromatic urethane (meth)acrylates, and polyester (meth)acrylates.

The polymerizable compound may contain an N-vinyl compound as another monofunctional or polyfunctional monomer. Examples of the N-vinyl compound include N-vinylformamide, N-vinylcarbazole, N-vinylacetamide, N-vinylpyrrolidone, N-vinylcaprolactam and acryloyl morpholine, and derivatives of these N-vinyl compounds.

(Meth)acrylic acid esters or (meth)acrylates are suitably used in the inks.

Examples of such a (meth)acrylate include monofunctional (meth)acrylates, such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, flexible lactone-modified (meth)acrylate, t-butylcyclohexyl (meth)acrylate, dicyclopentanyl (meth)acrylate, dicyclopentenyloxyethyl (meth)acrylate, and dicyclopentenyl (meth)acrylate. Among these, phenoxyethyl (meth)acrylate is preferred.

Examples of the bifunctional (meth)acrylate include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A ethylene oxide adduct di(meth)acrylate, bisphenol A propylene oxide adduct di(meth)acrylate, hydroxypivalic acid neopentyl glycol di(meth)acrylate, and polytetramethylene glycol di(meth)acrylate. Among these, dipropylene glycol (meth)acrylate is preferred.

Examples of the trifunctional or more polyfunctional (meth)acrylates include trimethylolpropane tri(meth)acrylate, ethylene oxide-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

Among the above (meth)acrylates, monofunctional (meth)acrylates are preferably used as a polymerizable compound other than the vinyl ether-containing (meth)acrylic acid ester. In this instance, the viscosity of the ink is reduced, and the photo-polymerization initiator and other constituents can be sufficiently dissolved in the ink. Also, the ink can exhibit satisfactory ejection stability during ink jet recording. It is preferable that a monofunctional (meth)acrylate and a bifunctional (meth)acrylate are used in combination. The toughness, heat resistance and chemical resistance of the coating are thus enhanced. Combined use of phenoxyethyl (meth)acrylate and dipropylene glycol di(meth)acrylate is particularly advantageous.

The above polymerizable compounds other than the vinyl ether-containing (meth)acrylic acid ester may be used singly or in combination.

The content of the polymerizable compound other than the vinyl ether-containing (meth)acrylic acid ester is preferably 10% to 90% by mass, more preferably 30% to 90% by mass, still more preferably 60% to 90% by mass, relative to the total mass (100%) of the ink. By controlling the polymerizable compound content in such a range, the viscosity and odor of the ink can be reduced, and the solubility and reactivity of the photopolymerization initiator can be increased.

Surfactant

Preferably, the inks contain a surfactant. In particular, by adding a surfactant to the overcoating ink, the inks are more likely to satisfy the relationship in which the surface tension of the undercoating ink is higher than that of the overcoating ink. Also, by adding a surfactant to the undercoating ink as well as the overcoating ink, the undercoating ink exhibits a good burying property on the recording medium.

The surfactant may be, but is not limited to, a silicone surfactant, an acrylic surfactant, a cationic surfactant, an anionic surfactant, a nonionic surfactant, an amphoteric surfactant, or a fluorochemical surfactant. Preferably, a silicone surfactant or an acrylic surfactant is used. These surfactants can greatly reduce the surface tension of the ink and prevent damage to components and members coming into contact with the ink, such as the head and ink feeding mechanism of the recording apparatus.

The silicone surfactant may be, but is not limited to, a modified silicone, such as a polyester-modified silicone or a polyether-modified silicone. In particular, polyether-modified silicone can greatly reduce the surface tension of the ink, and consequently, the ink can exhibit a superior wetting/spreading property on the recording medium.

Preferred example of polyether-modified silicone may be polyether-modified polydimethylsiloxane, and preferred example of polyester-modified silicone may be polyester-modified polydimethyl siloxane.

Commercially available silicone surfactants include BYK-347, BYK-348, BYK-UV 3500, BYK-UV 3510, BYK-UV 3530, and BYK-UV 3570 (each product of BYK). Among these, BYK-UV 3500 is preferred from the viewpoint of enhancing the wetting/spreading property of the overcoating ink.

If an acrylic surfactant is used, a (meth)acrylic copolymer may be used.

Commercially available acrylic surfactants include 1970, 230, LF-1980, LF-1982 (−50), LF-1983 (−50), LF-1984 (−50), LHP-95, LHP-96, UVX-35, UVX-36, UVX-270, UVX-271, UVX-272, AQ-7120, and AQ-7130 (each product of Kusumoto Chemicals); BYK-350, BYK-352, BYK-354, BYK-355, BYK-358, BYK-380, BYK-381, and BYK-392 (each product of BYK); and Polyflow Nos. 57 and 95 (each product of Kyoeisha Chemical). If an acrylic surfactant is added to the undercoating ink, BYK-350 is suitable from the viewpoint of enhancing the ejection stability of the undercoating ink.

If the overcoating and undercoating inks contain a surfactant, the following three cases, preferably the third case, are advantageous from the viewpoint of satisfying the above-described relationship of the surface tensions.

In a first case, the overcoating ink and the undercoating ink contain the same surfactant, and the surfactant content in the overcoating ink is higher than that in the undercoating ink. The difference in surfactant content between the two inks is preferably 0.2% by mass or more, more preferably 0.3% by mass or more.

In the first case, the overcoating ink and the undercoating ink each may contain 0.1% to 0.5% by mass of surfactant relative to the total mass (100%) of the ink, and the surfactant content in the undercoating ink may be 0.1% to 0.3% by mass.

In the first case, the wetting/spreading property of the overcoating ink is enhanced. In addition, since the same surfactant is used in both the overcoating ink and the undercoating ink, material cost can be reduced.

In a second case, the overcoating ink and the undercoating ink each contain the same or different modified silicone surfactant, and the surfactant content in the overcoating ink is higher than that in the undercoating ink. The difference in surfactant content between the two inks is preferably 0.2% by mass or more, more preferably 0.3% by mass or more.

In the second case, preferably, the modified silicone surfactants in the two inks are each a polyether-modified silicone or a polyester-modified silicone, more preferably, a polyether-modified silicone. Preferably, the same modified silicone is used from the viewpoint of reducing material cost.

In the second case, the overcoating ink and the undercoating ink each may contain 0.1% to 0.5% by mass of surfactant relative to the total mass (100%) of the ink, and the surfactant content in the undercoating ink may be 0.1% to 0.3% by mass. In the second case, the undercoating ink exhibits a good burying property on the recording medium.

In a third case, the overcoating ink contains a modified silicone surfactant. In this instance, the undercoating ink does not necessarily contain a surfactant. If the undercoating ink contains a surfactant, the surfactant is preferably an acrylic surfactant. By adding a modified silicone surfactant to the overcoating ink, the overcoating ink exhibits a higher wetting/spreading property. The modified silicone surfactant may be, but is not limited to, a polyether-modified silicone or a polyester-modified silicone. Polyether silicone surfactants are easily available and help the undercoating ink exhibit a satisfactory burying property, and are accordingly preferred.

In the third case, the overcoating ink and the undercoating ink each may contain 0.1% to 0.5% by mass of surfactant relative to the total mass (100%) of the ink, and the surfactant content in the undercoating ink may be 0.1% to 0.3% by mass.

In the third case, the overcoating ink exhibits superior wetting/spreading properties. The third case is advantageous in stably ensuring a difference in surface tension between the overcoating ink and the undercoating ink.

Photopolymerization Initiator

The inks may contain a photopolymerization initiator. The photopolymerization initiator is used to cure the ink on the surface of the recording medium by photopolymerization caused by irradiation with radiation, thus forming printed characters or images. Ultraviolet (UV) light may be used as the radiation. UV light is superior in safety, and the use of UV light reduces the cost of light source. Any photopolymerization initiator can be used as long as it can produce an active species, such as a radical or a cation, with light energy, and thus initiates a polymerization of the polymerizable compound in the ink. For example, a photo-radical polymerization initiator or a photo-cationic polymerization initiator may be used without particular limitation, and preferably, a photo-radical polymerization initiator is used.

Examples of the photo-radial polymerization initiator include aromatic ketones, acylphosphine oxide compounds, aromatic onium salt compounds, organic peroxides, thio compounds (such as thioxanthone compounds and thiophenyl group-containing compounds), hexaaryl biimidazole compounds, ketoxime ester compounds, borate compounds, azinium compounds, metallocene compounds, active ester compounds, compounds having a carbon-halogen bond, and alkylamine compounds.

Preferably, an acylphosphine oxide compound is use. Acylphosphine oxides can enhance the curability of the ink. A thioxanthone compound may be used in addition to an acylphosphine oxide compound.

More specifically, examples of the photo-radical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio) phenyl]-2-morpholino-propane-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Commercially available photo-radical polymerization initiators include IRGACURE 651 (2,2-dimethoxy-1,2-diphenylethane-1-one), IRGACURE 184 (1-hydroxycyclohexyl phenyl ketone), DAROCUR 1173 (2-hydroxy-2-methyl-1-phenyl-propane-1-one), IRGACURE 2959 (1-[4-(2-hydroxyethoxy)phenyl]-2-hydroxy-2-methyl-1-propane-1-one), IRGACURE 127 (2-hydroxy-1-{4-[4-(2-hydroxy-2-methyl-propionyl)benzyl]phenyl]-2-methylpropane-1-one}, IRGACURE 907 (2-methyl-1-(4-methylthiophenyl)-2-morpholinopropane-1-one), IRGACURE 369 (2-benzyl-2-dimethylamino-1-(4-morpholinophenyl)-1-butanone), IRGACURE 379 (2-(dimethylamino)-2-[(4-methylphenyl) methyl]-1-[4-(4-morpholinyl)phenyl]-1-butanone), DAROCUR TPO (2,4,6-trimethylbenzoyldiphenylphosphine oxide), IRGACURE 819 (bis(2,4,6-trimethylbenzoyl) phenylphosphine oxide), IRGACURE 784 (bis(η5-2,4-cyclopentadiene-1-yl)-bis(2,6-difluoro-3-(1H-pyrrole-1-yl) phenyl) titanium), IRGACURE OXE 01 (1-[4-(phenylthio) phenyl]-1,2-octanedione 2-(O-benzoyloxime)), IRGACURE OXE 02 (1-[9-ethyl-6-(2-methylbenzoyl)-9H-carbazole-3-yl]ethanone O-acetyl oxime), IRGACURE 754 (mixture of oxyphenylacetic acid, and 2-[2-oxo-2-phenylacetoxyethoxy] ethyl ester and 2-(2-hydroxyethoxy)ethyl ester) (each produced by BASF); Speedcure TPO and Speedcure DETX (2,4-diethylthioxanthone), Speedcure ITX (2-isopropylthioxanthone) (each produced by Lambson); KAYACURE DETX-S (2,4-diethylthioxanthone) (produced by Nippon Kayaku Co., Ltd.); Lucirin TPO, LR 8893, and LR 8970 (each produced by BASF); and Ubecryl P36 (produced by UCB).

The above photopolymerization initiators may be used singly or in combination.

From the viewpoint of increasing the UV curing speed to enhance the curability, and preventing stain of the photopolymerization initiator or undissolved part of the photopolymerization initiator, the photopolymerization initiator content is preferably 3% to 20% by mass relative to the total mass (100%) of the ink.

Polymerization Inhibitor

The inks may contain a polymerization inhibitor. By addition a polymerization inhibitor to the ink, the polymerizable compound in the ink can be prevented from polymerizing before curing, and thus the storage stability of the ink can be enhanced.

Examples of the polymerization inhibitor include, but are not limited to, phenols such as p-methoxyphenol, cresol, t-butyl catechol, 3,5-di-t-butyl-4-hydroxytoluene, 2,2'-methylene bis(4-methyl-6-t-butylphenol), 2,2'-methylene-bis(4-ethyl-6-butylphenol), and 4,4'-thio-bis(3-methyl-6-t-butylphenol), hindered amine, hydroquinone monomethyl ether (MEHQ), and hydroquinone.

The above polymerization inhibitors may be used singly or in combination. The polymerization inhibitor content is not particularly limited, and it depends on the proportion to the other constituents.

Coloring Material

The inks may contain a coloring material. The coloring material may be either or both of a pigment and a dye.

Pigment

The use of a pigment enhances the resistance to light of the ink. The pigment may be selected from inorganic pigments or organic pigments.

Exemplary inorganic pigments include carbon blacks (C. I. Pigment Black 7), such as furnace black, lampblack, acetylene black, and channel black; iron oxide; and titanium oxide.

Exemplary organic pigments include insoluble azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

Carbon blacks may be used for black inks. Examples of such a carbon black include No. 2300, No. 900, MCF 88, No. 33, No. 40, No. 45, No. 52, MA7, MA8, MA100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by Cabot); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (each produced by Degussa).

Pigments that can be used for a white ink include C. I. Pigment whites 6, 18, and 21.

Pigments that can be used in a yellow ink include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Pigments that can be used in a magenta ink include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224 and 245, and C. I. Pigment Violets 19, 23, 32, 33, 36, 38, 43 and 50.

Pigments that can be used in a cyan ink include C. I. Pigment Blues 1, 2, 3, 15, 15:1, 15:2, 15:3, 15:34, 15:4, 16, 18, 22, 25, 60, 65 and 66, and C. I. Vat Blues 4 and 60.

Pigments that can be used for colors other than magenta, cyan and yellow include C. I. pigment greens 7 and 10, C. I. Pigment Browns 3, 5, 25, and 26, and C. I. Pigment Oranges 1, 2, 5, 7, 13, 14, 15, 16, 24, 34, 36, 38, 40, 43, and 63.

The above pigments may be used singly or in combination.

If a pigment is used in the ink, the average particle size of the pigment is preferably 300 nm or less, and more preferably 50 to 200 nm. Such a pigment can be stably dispersed in the ink, and the ink can be reliable in, for example, ejection stability, and can form high-quality images. The average particle size mentioned herein is a value measured by dynamic light scattering.

Dye

A dye may be used as a coloring material. Any dye, such as acid dyes, direct dyes, reactive dyes, and basic dyes, may be used without particular limitation. Examples of the dye include C. I. Acid Yellows 17, 23, 42, 44, 79 and 142, C. I. Acid Reds 52, 80, 82, 249, 254 and 289, C. I. Acid Blues 9, 45 and 249, C. I. Acid Blacks 1, 2, 24 and 94, C. I. Food Blacks 1 and 2, C. I. Direct Yellows 1, 12, 24, 33, 50, 55, 58, 86, 132, 142, 144 and 173, C. I. Direct Reds 1, 4, 9, 80, 81, 225 and 227, C. I. Direct Blues 1, 2, 15, 71, 86, 87, 98, 165, 199 and 202, C. I. Direct Blacks 19, 38, 51, 71, 154, 168, 171 and 195, and C. I. Reactive Reds 14, 32, 55, 79 and 249, and C. I. Reactive Blacks 3, 4 and 35. The above dyes may be used singly or in combination.

The coloring material content is preferably 0.5% to 20% by mass relative to the total mass (100% by mass) of the ink. Such a content results in a high hiding power and a high color reproduction.

Additives

The inks may further contain additives (constituents). Possible additives include, but are not limited to, known dispersants, polymerization promoters, penetration enhancers, and wetting agents (moisturizing agents). In addition, other additives may be added, such as a fixing agent, a fungicide, a preservative, an antioxidant, an ultraviolet absorbent, a chelating agent, and a thickener.

In the use of the photo-curable ink jet ink set of the above-described embodiment, when the overcoating ink is applied on a coating of the undercoating ink, the line width of the overcoating ink is not reduced. Thus, the overcoating ink exhibits a good wetting/spreading property. In addition, both the overcoating ink and the undercoating ink of the photo-curable ink jet ink set exhibit high curability and ejection stability, and the undercoating ink exhibits satisfactory burying property on the recording medium. As described above, in the photo-curable ink jet ink set, the undercoating ink and the overcoating ink are interactive in terms of composition and physical properties. In other words, for controlling the compositions and physical properties of one of the undercoating and overcoating inks, it is required that the compositions and physical properties of both inks be taken into account.

Recording Medium

The photo-curable ink jet ink set of an embodiment of the invention is used for forming a recorded article by an ink jet recording method described later, in which the inks of the ink set are ejected onto a recording medium. The recording medium may be absorbent or non-absorbent. The ink jet recording method described later can be widely applied to various recording media from a non-absorbent recording medium into which inks cannot easily penetrate to an absorbent recording medium into which inks easily penetrate.

Absorbent recording media include, but are not limited to, plane paper such as electrophotographic paper having high permeability to inks, ink jet paper having an ink absorbing layer containing silica particles or alumina particles or an ink absorbing layer made of a hydrophilic polymer such as polyvinyl alcohol (PVA) or polyvinyl pyrrolidone (PVP), and art paper, coat paper and cast-coated paper that are used for ordinary offset printing and have relatively low permeability to inks.

Non-absorbent recording media include, but are not limited to, plastic films, sheets and plates, such as those of polyvinyl chloride, polyethylene, polypropylene, and polyethylene terephthalate (PET); metal plates, such as those of iron, silver, copper, and aluminum; metal-coated metal plates or plastic films formed by vapor-depositing those metals on a metal plate or plastic film; and alloy plates, such as those of stainless steel and brass.

Ink Jet Recording Method

An ink jet recording method according to an embodiment of the invention will be described below. In the ink jet recording method, an ink set according to an embodiment of the invention is used.

Ink Jet Recording Apparatus for Ink Jet Recording Method

An ink jet recording apparatus (hereinafter simply referred to as the recording apparatus) used in the ink jet recording method will now be described. The recording apparatus includes a recording control section, and operates in a first recording mode or a second recording mode.

In the first recording mode, a coating of the overcoating ink is formed on a coating of the undercoating ink by overcoating the coating of the undercoating ink with the overcoating ink.

In the second recording mode, a coating of the undercoating ink is formed on a coating of the overcoating ink by overcoating the coating of the overcoating ink with the undercoating ink.

The recording control section controls the amount per dot of ink in a solid image of the undercoating ink in the first and second recording modes. The recording apparatus may have the following structure.

The figure schematically shows head units and a transport unit of a recording apparatus applicable to the ink jet recording method of the present embodiment of the invention. A recording medium S in the form of continuous sheet is transported in a transport direction from an upstream side to a downstream side in association with the rotation of an upstream roller 12A, a transport drum 12, and a downstream roller 12B. The head units include a first white head unit 30A (located at the leftmost in the figure) that ejects a white ink W, a yellow heat unit 30B that ejects a yellow ink Y, a magenta head unit 30C that ejects a magenta ink M, a cyan head unit 30D that ejects a cyan ink C, a black head unit 30E that ejects a black ink K, and a second white head unit 30A (located at the rightmost in the figure) that ejects a white ink W. An irradiation unit 40 includes irradiation portions 42a, 41a, 41b, 41c, 41d and 42b that are provided for each head unit at the downstream side of the corresponding head unit, and an irradiation portion 43 provided at the end of the transport. The recording apparatus may be in the structure shown in FIG. 2 disclosed in JP-A-2010-208218.

In the first recording mode, first, the recording medium is transported to the position opposing the first white head unit 30A, and the first head unit 30A ejects an undercoating ink to the recording medium S. The ejected undercoating ink is irradiated from the irradiation portion 42a to form a coating of the undercoating ink. Subsequently, the recording medium S is transported to the portion opposing each head unit from one to another, and an overcoating ink is ejected from at least one of the yellow head unit 30B, the magenta head unit 30C, the cyan head unit 30D and the black head unit 30E onto the coating of the undercoating ink. The overcoating ink is irradiated from the irradiation portion at the downstream side of the head unit that has ejected the overcoating ink. Finally, irradiation portion 43 irradiates the overcoating ink to form a coating. In the first recording mode, the second white head unit 30A and the irradiation portion 42b are not used.

On the other hand, in the second recording mode, the recording medium S is transported to the portion opposing each head unit from one to another, and an overcoating ink is ejected, in the order in which the recording medium is transported, from at least one of the yellow head unit 30B, the magenta head unit 30C, the cyan head unit 30D and the black head unit 30E onto the recording medium S, and the ejected overcoating ink is irradiated from the irradiation portion at the downstream side of the head unit that has ejected the overcoating ink to form a coating of the overcoating ink. Subsequently, the second white head unit 30A ejects an undercoating ink onto the coating of the overcoating ink, followed by irradiation from the irradiation portion 42b. Finally, irradiation from the irradiation portion 43 is performed to form a coating. In the second recording mode, the first white head unit 30A and the irradiation portion 42a are not used.

Preferably, when a solid coating is formed with the undercoating ink, the recording control section controls so that the amount per dot of the undercoating ink in the second recording mode is more than 10% larger, preferably 10% to 50% larger, than that in the first recording mode. Thus, the undercoating ink in the second recording mode can exhibit substantially the same wetting/spreading properties as in the first recording mode. The dot mentioned herein refers to a mark of an ink formed in a pixel, which is a minimum recording unit area defining a recording resolution.

The recording apparatus does not necessarily have the function for performing the second recording mode. In this instance, the second white head unit 30A and the irradiation portion 42b may be omitted. The ink that forms a coating afterward, that is, the overcoating ink in the first recording mode or the undercoating ink in the second recording mode, may be cured only by irradiation from at least one of the irradiation portions (41a to 41d and 42b) provided at the downstream sides of the respective head units and the irradiation portion 43. If the ink is cured by the irradiation portion at the downstream side of the corresponding head unit, the irradiation portion 43 at the end of the transport may be omitted.

Overcoating Ink and Undercoating Ink

In the present embodiment, in the first recording mode, the undercoating ink is an ink that will form a coating on a recording medium before the overcoating ink, and the overcoating ink is an ink that will form a coating on the coating of the undercoating ink on the recording medium. One of the overcoating ink and the undercoating ink may be a main ink, and the other may be an auxiliary ink. For example, an ink that forms a visible coating of, for example, a color ink, can be used as the main ink. Also, a white ink, a clear ink, a metallic ink or any other special ink, or a functional ink for improving the properties of the main ink, such as adhesion, wetting/spreading property, and rub fastness, may be used as the auxiliary ink.

Both the overcoating ink and the undercoating ink may be used as main inks, or used as auxiliary inks. However, it is preferable that one of the overcoating ink and the undercoating ink be used as the main ink while the other is used as the auxiliary ink from the viewpoint of expanding the application of the recorded article and improving the properties of the main ink. If one of the inks is used as the main ink while the other is used as the auxiliary ink, which ink is used as the main ink can be determined according to the properties of the overcoating ink and the undercoating ink. Therefore, the undercoating ink is not limited to a white ink although, in the figure, the head that ejects the undercoating ink in the first recording mode is the first white head unit 30A.

In the second recording mode, the line width of the undercoating ink on the coating of the overcoating ink is reduced, and accordingly, the burying property of the solid image of the undercoating ink is reduced. Therefore, the amount per dot of ink is varied between the first recording mode and the second recording mode. By increasing the amount per dot of the undercoating ink, the undercoating ink can exhibit a satisfactory burying property.

Ink Jet Recording Method Using Ink Jet Recording Apparatus

The ink jet recording method according to an embodiment of the invention includes a first recording operation in which a coating of the undercoating ink of the above embodiment is formed on a recording medium, and a second recording operation in which an image is formed by overcoating the coating of the undercoating ink with the overcoating ink of the above embodiment.

Each of the first and second recording operations includes the step of ejecting an ink to the recording medium (ejection step) and the step of irradiating the ejected ink with UV light to cure the ink (irradiation step). The cured inks form an image, that is, a cured ink coating. These steps will be described below.

Ejection Step

In the ejection step, an ink is ejected to the recording medium. The undercoating ink is ejected onto a recording medium, and the overcoating ink is ejected onto the coating of the undercoating ink. Preferably, the ink to be ejected has a viscosity of 15 mPa·s or less, more preferably 12 mPa·s or less. An ink having a viscosity in such a range can be ejected at room temperature or without being heated. Preferably, the temperature of the ink to be ejected is 20 to 30° C. Alternatively, the ink may be heated to a predetermined temperature so that the viscosity of the ink is adjusted to a level suitable to be ejected. Thus the ink is stably ejected.

The undercoating ink and overcoating ink used in the present embodiment are photo-curable and have higher viscosities than general aqueous inks. Accordingly, the viscosities of the inks are considerably varied by temperature changes of the ink to be ejected. Such variation in viscosity of the ink significantly affects the size of ink droplets and the ejection speed of the droplets, and may result in a degraded image quality. Accordingly, it is preferable that the ink is kept at a constant temperature while being ejected.

Curing Step

In the curing step, the ink ejected to and deposited (landed) on the recording medium is cured by irradiation with UV light. More specifically, the photopolymerization initiator in the ink is decomposed to produce an initiation species, such as a radical, an acid or a base, by the irradiation with light (UV light), and the initiation species induces the polymerization of the polymerizable compound. Alternatively, the polymerizable compound may initiate a polymerization reaction by irradiation with UV light. At this time, if a sensitizing dye is present in the ink together with the polymerization initiator, the sensitizing dye is excited by absorbing UV light. The excited sensitizing dye then comes into contact with the polymerization initiator and promotes the decomposition of the polymerization initiator, and thus, a highly sensitive curing reaction can be performed.

A mercury lamp or a solid laser is generally used as an UV light source. For curing photo-curable ink jet inks, a mercury lamp or a metal halide lamp is widely used. However, since the light source is desired to be mercury-free from the viewpoint of environmental protection, the use of GaN-based semiconductor UV emission devices is advantageous in industry and environment. Also, ultraviolet light-emitting diodes (UV-LEDs) and ultraviolet laser diodes (UV-LDs), which are small and inexpensive and have long life and high efficiency, are considered to a useful light source for photo-curable ink jet recording. UV-LEDs are advantageous.

For example, a UV-LED having an emission peak at a wavelength in the range of 350 to 420 nm is advantageously used. The power of such a UV-LED is easy to increase. In this instance, an ink set of photo-curable ink jet inks that can be cured at an irradiation energy of 200 mJ/cm$^2$ or less is suitably used. Thus, low-cost, high-speed printing can be achieved. Such photo-curable inks contain at least either a photopolymerization initiator that will be decomposed by irradiation with UV light having a wavelength in the above range or a polymerizable compound that will initiates a polymerization by irradiation with UV light having a wavelength in the above range.

According to the ink jet recording method of the present embodiment, the photo-curable ink jet ink set can exhibit superior properties. The overcoating ink exhibits a satisfactory wetting/spreading property; both the overcoating ink and the undercoating ink exhibit high curability and ejection stability; and the undercoating ink exhibits satisfactory burying property on the recording medium.

EXAMPLES

The above-described embodiments of the invention will now be further described in detail with reference to, but without limitation to, Examples.

Materials Used

The following materials were used in the Examples and Comparative Examples.

Pigment
  C. I. Pigment Blue 15:3 (Phthalocyanine Blue produced by DIC, hereinafter abbreviated as PB 15:3)
  C. I. Pigment White 6 (titanium oxide produced by Tayca Corp., hereinafter abbreviated as PW6)

Polymerizable Compound
1. Vinyl Ether-Containing (Meth)acrylic Acid Ester
  VEEA (2-(2-vinyloxyethoxy)ethyl acrylate, produced by Nippon Shokubai Co., Ltd., hereinafter abbreviated as VEEA)
2. Other Polymerizable Compounds
  Biscoat #192 (product name of phenoxyethyl acrylate (hereinafter abbreviated as PEA) produced by Osaka Organic Chemical Industry Ltd.)
  NK ESTER APG-100 (Product of dipropylene glycol diacrylate (hereinafter abbreviated as DPGDA) produced by Shin-Nakamura Chemical)

Polymerization Inhibitor
  MEHQ (hydroquinone monomethyl ether, produced by Kanto Chemical)

Surfactant
  BYK-UV 3500 (silicone surfactant product of BYK, hereinafter abbreviated as UV 3500)
  BYK-UV 3570 (silicone surfactant product of BYK, hereinafter abbreviated as UV 3570)
  BYK-350 (acrylic surfactant product of BYK, hereinafter represented by BYK 350)
  BYK-381 (acrylic surfactant product of BYK, hereinafter represented by BYK 381)

Photopolymerization Initiator
  IRGACURE 819 (product of BASF, solid content: 100%, hereinafter abbreviated as 819)
  DAROCUR TPO (product of BASF, solid content: 100%, hereinafter abbreviated as TPO)
  KAYACURE DETX-S (product of Nippon Kayaku, solid content: 100%, hereafter abbreviated as DETX)

Preparation of Overcoating Ink and Undercoating Ink

An overcoating cyan ink and an undercoating white ink were prepared by mixing the above constituents in the proportions (percent by mass) shown in Table 1 or 2 and stirring the mixture with a high-speed water-cooling agitator.

Table 1 shows the compositions of the prepared overcoating inks, and in which overcoats 1, 2, 3 and 4 represents overcoating inks 1, 2, 3 and 4, respectively. Similarly, Table 2 shows the compositions of the prepared undercoating inks, and in which undercoats 1, 2, 3, 4, 5, 6 and 7 represents overcoating inks 1, 2, 3, 4, 5, 6 and 7, respectively.

TABLE 1

| | Overcoat 1 | Overcoat 2 | Overcoat 3 | Overcoat 4 |
|---|---|---|---|---|
| VEEA | 20 | — | 20 | 20 |
| PEA | 35 | 45 | 35 | 35 |
| DPGDA | 31.6 | 41.6 | 31.6 | 31.6 |
| 819 | 4 | 4 | 4 | 4 |
| TPO | 4 | 4 | 4 | 4 |
| DETX | 2 | 2 | 2 | 2 |

TABLE 1-continued

|  | Overcoat 1 | Overcoat 2 | Overcoat 3 | Overcoat 4 |
|---|---|---|---|---|
| MEHQ | 0.2 | 0.2 | 0.2 | 0.2 |
| UV3500 | 0.2 | 0.2 | — | — |
| UV3570 | — | — | — | 0.2 |
| BYK350 | — | — | 0.2 | — |
| PB15:3 | 3 | 3 | 3 | 3 |
| Total | 100.0 | 100.0 | 100.0 | 100.0 |

TABLE 2

|  | Undercoat 1 | Undercoat 2 | Undercoat 3 | Undercoat 4 | Undercoat 5 | Undercoat 6 | Undercoat 7 |
|---|---|---|---|---|---|---|---|
| VEEA | 30 | 30 | 30 | 30 | 30 | — | 70 |
| PEA | 15 | 15 | 15 | 15 | 15 | 30 | 1 |
| DPGDA | 26.6 | 26.4 | 26.8 | 26.6 | 26.6 | 41.6 | 0.4 |
| 819 | 4 | 4 | 4 | 4 | 4 | 4 | 4 |
| TPO | 4 | 4 | 4 | 4 | 4 | 4 | 4 |
| DETX | 2 | 2 | 2 | 2 | 2 | 2 | 2 |
| MEHQ | 0.2 | 0.2 | 0.2 | 0.2 | 0.2 | 0.2 | 0.2 |
| UV3500 | — | — | — | 0.2 | — | — | — |
| BYK350 | 0.2 | 0.4 | — | — | — | 0.2 | 0.4 |
| BYK381 | — | — | — | — | 0.2 | — | — |
| PW6 | 18 | 18 | 18 | 18 | 18 | 18 | 18 |
| Total | 100.0 | 100.0 | 100.0 | 100.0 | 100.0 | 100.0 | 100.0 |

EXAMPLES 1 to 7, COMPARATIVE EXAMPLES 1 to 5

Ink sets were prepared in the combinations of the overcoating ink and the undercoating ink shown in Tables 3 and 4. In Tables 3 and 4, the surface tensions γ (mN/m) of the overcoating ink and the undercoating ink are measurements obtained by the Wilhelmy method using a surface tension meter CBVP-Z (product of Kyowa Interface Science) at room temperature and normal pressure.

Evaluation

The wetting/spreading property, burying property, ejection stability and curability of the ink sets prepared in Examples and Comparative Examples were evaluated.

1. Wetting/Spreading Property

The undercoating ink was ejected onto a recording medium (PET50A, manufactured by Lintec Corporation) at 720 dpi by 720 dpi and 15 ng/dot. The ejected ink was then cured to form a cured film. Then, a line of dots (dots in a line) with 720 dpi was formed on the cured film using the overcoating ink at 10 ng/dot.

Before ejection, the viscosity of each ink was adjusted to 10 mPa·s by adjusting the temperature of the ink. For evaluation, the line width (X) of the cured line of the overcoating ink formed on the cured film of the undercoating ink was measured. The evaluation criteria were as follows, and the results are shown in Table 3 and 4:

A: 70 μm≤X

B: 65 μm≤X<70 μm

C: 60 μm≤X<65 μm

D: X<60 μm

2. Burying Property

The undercoating ink was ejected onto a recording medium (PET50A) at 720 dpi by 720 dpi and 10 ng/dot, followed by curing.

Before ejection, the viscosity of the ink was adjusted to 10 mPa·s by adjusting the temperature of the ink. The resulting cured film was visually observed for the burying property of the undercoating ink.

he evaluation criteria were as follows, and the results are shown in Table 3 and 4:

A: when the sample was visually viewed from a height of 30 cm from the recording medium, the surface of the recording medium was covered with the cured film and striped marks of the underlying recording medium were not observed.

B: when the sample was visually viewed from a height of 30 cm from the recording medium, striped marks of the recording medium were observed.

3. Ejection Stability

The ejection stabilities of the overcoating ink and the undercoating ink were evaluated. The overcoating ink and the undercoating ink were each continuously ejected for 60 minutes from a head having 180 nozzles. Thus the ejection stabilities of the overcoating and undercoating inks were evaluated. The evaluation criteria were as follows, and the results are shown in Table 3 and 4:

A: nozzle fault (ejection failure) did not occur during continuous ejection.

B: nozzle fault (ejection failure) occurred during continuous ejection.

4. Curability

The curabilities of the overcoating ink and the undercoating ink was evaluated. The nozzles of the nozzle lines of each ink were charged with the corresponding ink of the overcoating and undercoating inks. The overcoating ink and the undercoating ink were each ejected onto a recording medium (PET50A) at 720 dpi by 720 dpi and 10 ng/dot to form a solid image so that the resulting printed article (recorded article) would have a thickness of 7 to 8 μm.

Then, the solid image was irradiated with UV light having a peak wavelength of 395 nm and an irradiation intensity of 1 W/cm$^2$ from a UV-LED in a UV irradiation apparatus disposed at a side of the carriage at irradiation energies gradually increased to 200 mJ/cm$^2$ for a pass. Thus, a recorded article was produced. When the surface of the coating film became unsticky during irradiation, the ink was considered to have been cured at that time.

Whether or not the coating film was sticky was determined from the following. It was determined according to whether the ink was attached to a cotton swab or whether the solid image was scratched. When the ink was not attached to a cotton swab while the solid image was not scratched, the film coating was determined to be unsticky. For this evaluation, Johnson swab manufactured by Johnson & Johnson was used as the cotton swab. The solid image was reciprocally rubbed ten times at a load of 100 g.

The number of passes refers to the number of UV irradiation operations performed by moving the head to the recording medium and irradiating the coating film from a UV irradiation apparatus mounted to the head. Irradiation energy (mJ/cm$^2$) were calculated as a product of the irradiation intensity (mW/cm$^2$) at a surface irradiated from the light source and the time (s) for which the irradiation had been continued. Irradiation intensity was measured with a UV intensity meter UM-10 and a light receiver UM-400 (each produced by Konica Minolta Sensing, Inc.) The evaluation criteria were as follows, and the results are shown in Table 3 and 4:

A: The solid image was cured at an irradiation energy of 200 mJ/cm$^2$ or less.
B: The solid image was not cured at an irradiation energy of 200 mJ/cm$^2$.

Additional examination, but not shown in the Tables, was performed using an undercoating ink prepared in the same manner as undercoating ink 3 except that the DPGDA content was set to 26.75% by mass and 0.05% by mass of UV 3500 was added as a surfactant, and overcoating inks 1 and 4. The results were as follows: the burying property of the undercoating ink on the recording medium was B; ejection stability of the undercoating ink was A; the curability of the undercoating ink was A; the differences in surface tension between the undercoating ink and the overcoating ink (γ of undercoating ink–γ of overcoating ink) were each 5 mN/m; and the wetting/spreading properties of the overcoating inks were each B.

TABLE 3

|  | Example 1 | Example 2 | Example 3 | Example 4 | Example 5 | Example 6 | Example 7 |
|---|---|---|---|---|---|---|---|
| Overcoating ink No. | Overcoat 1 | Overcoat 1 | Overcoat 1 | Overcoat 2 | Overcoat 1 | Overcoat 1 | Overcoat 4 |
| Undercoating ink No. | Undercoat 1 | Undercoat 2 | Undercoat 3 | Undercoat 1 | Undercoat 7 | Undercoat 5 | Undercoat 1 |
| Surfactant in overcoating ink | Silicone UV 3500 | Silicone UV 3500 | Silicone UV 3500 | Silicone UV 3500 | Silicone UV 3500 | Silicone UV 3500 | Silicone UV 3570 |
| Surfactant in undercoating ink | Acrylic BYK 350 | Acrylic BYK 350 | — | Acrylic BYK 350 | Acrylic BYK 350 | Acrylic BYK 381 | Acrylic BYK 350 |
| Undercoating ink γ-overcoating ink γ | 10 | 5 | 15 | 10 | 10 | 10 | 8 |
| VEEA (mass %) in overcoating ink | 20 | 20 | 20 | 0 | 20 | 20 | 20 |
| VEEA (mass %) in undercoating ink | 30 | 30 | 30 | 30 | 70 | 30 | 30 |
| Wetting/spreading properties of overcoating ink | A | B | A | A | A | A | B |
| Burying property of undercoating ink on recording medium | A | A | B | A | A | A | A |
| Ejection stability of overcoating ink | A | A | A | A | A | A | A |
| Ejection stability of undercoating ink | A | A | A | A | A | B | A |
| Curability of overcoating ink | A | A | A | B | A | A | A |
| Curing ability of undercoating ink | A | A | A | A | A | A | A |

TABLE 4

|  | Comparative Example 1 | Comparative Example 2 | Comparative Example 3 | Comparative Example 4 | Comparative Example 5 |
|---|---|---|---|---|---|
| Overcoating ink No. | Overcoat 1 | Overcoat 1 | Overcoat 3 | Overcoat 3 | Overcoat 2 |
| Undercoating ink No. | Undercoat 6 | Undercoat 4 | Undercoat 1 | Undercoat 4 | Undercoat 6 |
| Surfactant in overcoating ink | Silicone UV 3500 | Silicone UV 3500 | Acrylic BYK 350 | Acrylic BYK 350 | Silicone UV 3500 |
| Surfactant in undercoating ink | Acrylic BYK 350 | Silicone UV 3500 | Acrylic BYK 350 | Silicone UV 3500 | Acrylic BYK 350 |
| Undercoating ink γ-overcoating ink γ | 10 | 0 | 0 | −10 | 10 |
| VEEA (mass %) in overcoating ink | 20 | 20 | 20 | 20 | 0 |
| VEEA (mass %) in undercoating ink | 0 | 30 | 30 | 30 | 0 |
| Wetting/spreading properties of overcoating ink | C | C | C | D | C |
| Burying property of undercoating ink on recording medium | B | A | A | A | B |
| Ejection stability of overcoating ink | A | A | A | A | A |
| Ejection stability of undercoating ink | A | A | A | A | A |
| Curability of overcoating ink | A | A | A | A | B |
| Curing ability of undercoating ink | B | A | A | A | B |

The results of the above evaluations show that the ink sets of the Examples, each including an undercoating ink containing a (meth)acrylic acid ester having a vinyl ether group expressed by general formula (I) and an overcoating ink having a lower surface tension than the undercoating film, exhibited superior properties to the ink sets of Comparative Examples. Specifically, the overcoating ink exhibited superior wetting/spreading property, the overcoating and undercoating inks exhibited high curability and ejection stability, and that the undercoating ink exhibited satisfactory burying property on the recording medium.

The entire disclosure of Japanese Patent Application No.: 2012-043261, filed Feb. 29, 2012 is expressly incorporated by reference herein.

What is claimed is:

1. A photo-curable ink jet ink set comprising:
an undercoating photo-curable ink jet ink having a surface tension and containing a (meth) acrylic acid ester having a vinyl ether group expressed by general formula (I):
$CH_2=CR^1-COOR^2-O-CH=CH-R^3$, wherein $R^1$ represents a hydrogen atom or a methyl group, $R^2$ represents a divalent organic residue having a carbon number of 2 to 20, and $R^3$ represents a hydrogen atom or a monovalent organic residue having a carbon number of 1 to 11; and an overcoating photo-curable ink jet ink having a surface tension, wherein the surface tension of the undercoating photocurable ink jet ink is higher than the surface tension of the overcoating photo-curable ink jet ink, and wherein the undercoating photo-curable ink jet ink and the overcoating photo-curable ink jet ink each contain a coloring material.

2. The photo-curable ink jet ink set according to claim 1, wherein the difference in surface tension between the undercoating photo-curable ink jet ink and the overcoating photo-curable ink jet ink is 5 mN/m or more.

3. The photo-curable ink jet ink set according to claim 1, wherein the content of the (meth)acrylic acid ester in the undercoating photo-curable ink jet ink is 20% to 80% by mass relative to the total mass of the undercoating photo-curable ink jet ink.

4. The photo-curable ink jet ink set according to claim 1, wherein the overcoating photo-curable ink jet ink contains a (meth)acrylic acid ester having a vinyl ether group expressed by general formula (I) in a lower content than the content of the (meth)acrylic acid ester in the undercoating photo-curable ink jet ink.

5. The photo-curable ink jet ink set according to claim 1, wherein the undercoating photo-curable ink jet ink contains an acrylic surfactant.

6. The photo-curable ink jet ink set according to claim 1, wherein the overcoating photo-curable ink jet ink contains a silicone surfactant.

7. The photo-curable ink jet ink set according to claim 1, wherein the overcoating photo-curable ink jet ink is a color ink containing a nonwhite coloring material.

8. The photo-curable ink jet ink set according to claim 1, wherein the undercoating photo-curable ink jet ink is a white ink containing a white coloring material.

9. The photo-curable ink jet ink set according to claim 1, wherein the overcoating photo-curable ink jet ink contains a coloring material in a range from 0.5 to 20% by mass relative to the total mass of the ink.

10. The photo-curable ink jet ink set according to claim 1, wherein the overcoating photo-curable ink jet ink contains at least one of an organic pigment or an inorganic pigment as the coloring material.

11. An ink jet recording method using the photo-curable ink jet ink set as set forth in claim 1, the method comprising:
forming a coating of the undercoating photo-curable ink jet ink on a recording medium; and
forming a coating of the overcoating photo-curable ink jet ink on the coating of the undercoating photo-curable ink jet ink.

12. An ink jet recording method using the photo-curable ink jet ink set as set forth in claim 2, the method comprising:
forming a coating of the undercoating photo-curable ink jet ink on a recording medium; and
forming a coating of the overcoating photo-curable ink jet ink on the coating of the undercoating photo-curable ink jet ink.

13. An ink jet recording method using the photo-curable ink jet ink set as set forth in claim 3, the method comprising:
forming a coating of the undercoating photo-curable ink jet ink on a recording medium; and
forming a coating of the overcoating photo-curable ink jet ink on the coating of the undercoating photo-curable ink jet ink.

14. An ink jet recording method using the photo-curable ink jet ink set as set forth in claim 4, the method comprising:
forming a coating of the undercoating photo-curable ink jet ink on a recording medium; and
forming a coating of the overcoating photo-curable ink jet ink on the coating of the undercoating photo-curable ink jet ink.

15. An ink jet recording method using the photo-curable ink jet ink set as set forth in claim 5, the method comprising:
forming a coating of the undercoating photo-curable ink jet ink on a recording medium; and
forming a coating of the overcoating photo-curable ink jet ink on the coating of the undercoating photo-curable ink jet ink.

16. An ink jet recording method using the photo-curable ink jet ink set as set forth in claim 6, the method comprising:
forming a coating of the undercoating photo-curable ink jet ink on a recording medium; and
forming a coating of the overcoating photo-curable ink jet ink on the coating of the undercoating photo-curable ink jet ink.

* * * * *